G. E. LUCE.
STEAM PIPE RACK DRIER.
APPLICATION FILED APR. 13, 1920.
1,433,085.
Patented Oct. 24, 1922.
3 SHEETS—SHEET 3.
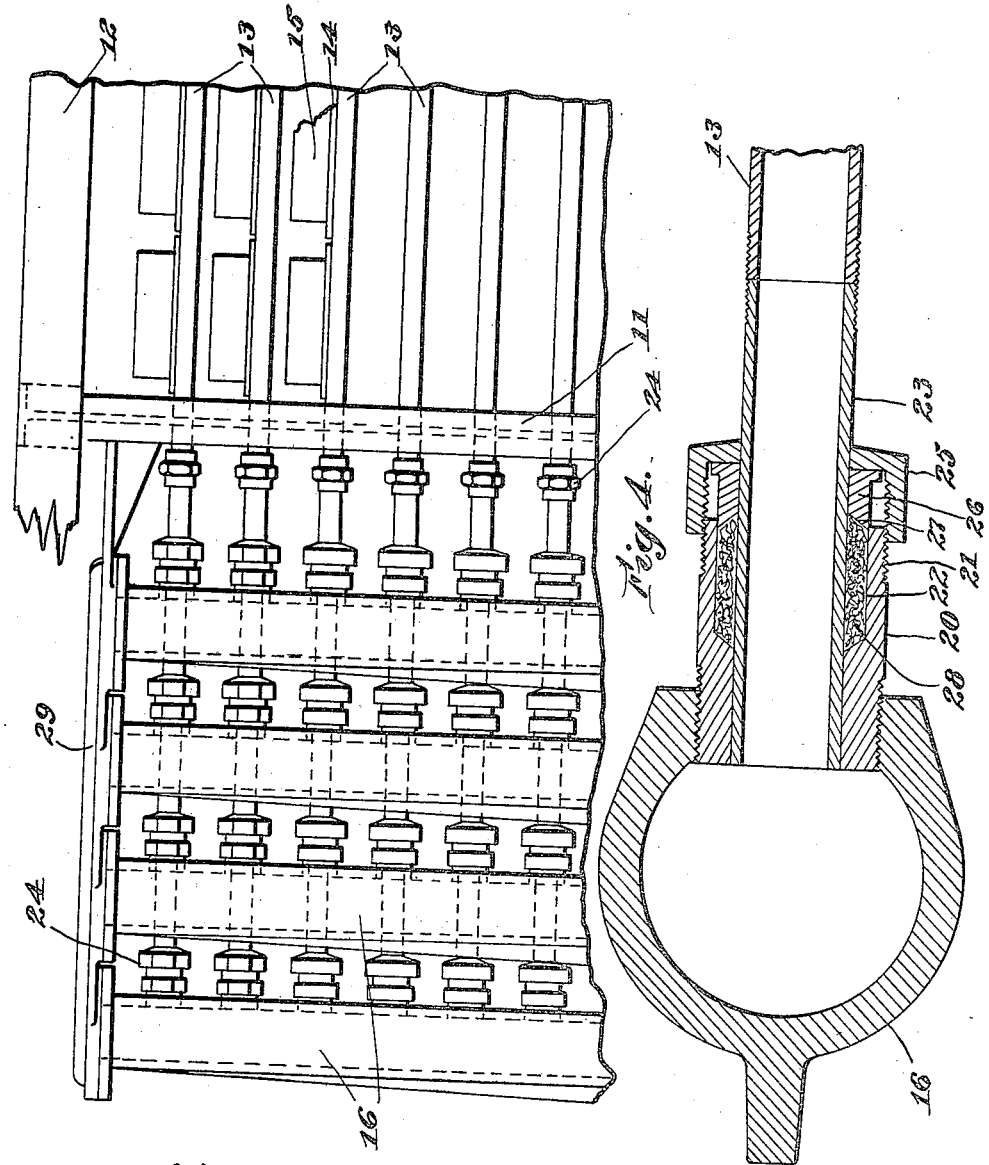

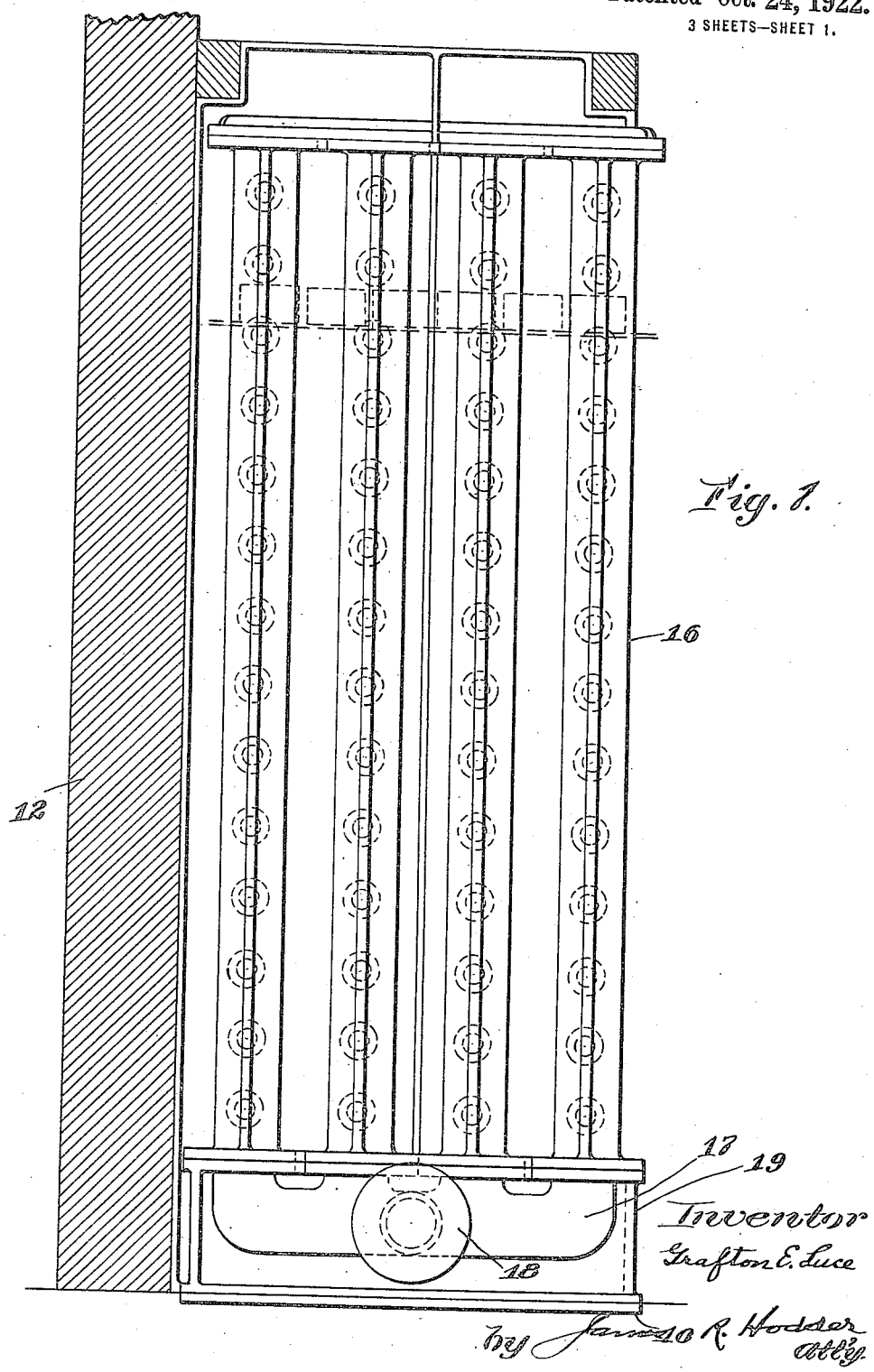

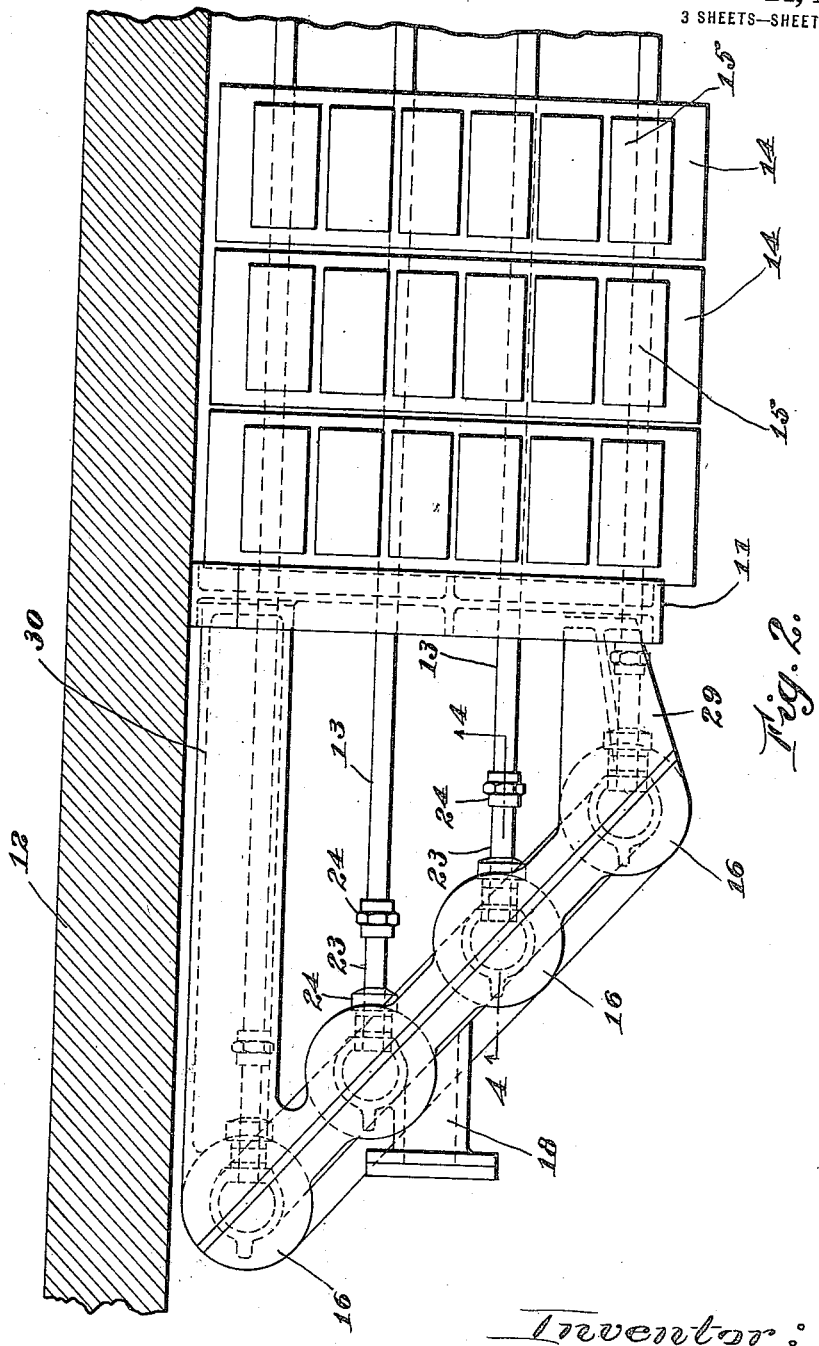

Patented Oct. 24, 1922.

1,433,085

UNITED STATES PATENT OFFICE.

GRAFTON E. LUCE, OF CHICAGO, ILLINOIS.

STEAM-PIPE RACK DRIER.

Application filed April 13, 1920. Serial No. 373,599.

*To all whom it may concern:*

Be it known that I, GRAFTON E. LUCE, a citizen of the United States, and resident of Chicago, in the county of Cook and State of Illinois, have invented an Improvement in Steam-Pipe Rack Driers, of which the following description, in connection with the accompanying drawings, is a specification, like letters on the drawings representing like parts.

My present invention relates to driers, and more particularly to steam pipe rack driers for use in the preliminary drying or curing of green brick preparatory to placing such bricks in a kiln to be burned.

Steam pipe rack driers, to which my invention has been applied, are usually constructed of pipes arranged in the form of shelves spaced an appropriate distance from center to center, depending on whether soft mud or stiff mud bricks are to be dried therein. Steel pallets are provided on which the green bricks are placed, these pallets being slid into place on the shelves formed by the series of pipes. In these driers considerable difficulty has been experienced in devising suitable expansion means for taking up the longitudinal expansion of the pipes constituting the rack, and this is true particularly in high pressure pipe rack driers. The expansion means is usually located at the exhaust end of the series of pipes constituting the rack and when built up in the ordinary way, it is extremely difficult to keep the joints steam tight. Constant attendance is necessary, and with the usual type of joint, special tools are necessary for assembling, adjusting, and dismounting the rack, as it is physically impossible to reach the connecting couplings with ordinary tools.

With a view to improving driers of this type, I have devised an expansion end, or head, which remains stationary, while the ends of the pipes comprising the series of pipes may move individually in the expansion end of head. Again, I have so devised the end or head, that all couplings or unions employed for connection or assembly are in plain view and readily accessible, thus enabling the elements constituting the pipe rack drier to be assembled, adjusted, and dismounted by the use of ordinary tools.

An object of my invention therefore, is an improved expansion end for a steam pipe rack drier.

Another object is an improved arrangement of the elements comprising the expansion of a steam pipe rack drier for rendering all unions and couplings employed readily accessible for assembly, adjustment, and dismounting.

Other objects and novel features of construction and arrangement of parts will appear as the description of the invention progresses.

In the accompanying drawings illustrating the preferred embodiment of my invention, Fig. 1 is an end elevation of my improved expansion end for steam pipe rack driers, Fig. 2 is a plan view, Fig. 3 is a fragmentary front elevation, and Fig. 4 is an enlarged vertical sectional view on the line 4—4 of Fig. 2.

Referring to the drawings, 10 designates a base plate, of sheet metal or the like, on which is placed the pipe support 11, this pipe support being rigidly secured to the wall 12 of the drier building, in any convenient manner. This pipe support is provided with regularly spaced holes, not shown, through which extend the ends of the pipes 13 of the drier. These pipes 13 are properly spaced, both vertically and horizontally, to define a plurality of shelves on which may be placed the pallets 14, of any suitable material, carrying each a plurality of bricks 15. The ends of the pipes 13 are threaded, as shown in Fig. 4, for a purpose to be hereinafter described.

A plurality of upright headers 16, 16, 16, 16, one for each vertical row of the pipes 13, four as shown in Fig. 2, terminate at the bottom in a manifold 17 provided with a flanged outlet 18 for connection to a trap. The headers 16 and manifold 17 rest on a frame 19, which in turn is secured to the plate 10, in any convenient manner.

One side of each header 16 is provided with a plurality of threaded holes, equal in number to the number of vertically arranged pipes 13, and in each of these holes is screwed a nipple 20, provided at its outer end with threads 21 and with an annular chamber 22 constituting one element of a stuffing box. Slidably mounted in each nipple 13 is a short length of pipe 23, whose outer end is threaded, as shown in Fig. 4. A union 24 connects each pipe 23 with a pipe 13. Slidable with respect to the pipe 23 is a stuffing nut 25 which screws onto the threads 21 of the nipple 20. A gland 26 at its inner end 27 fits into the annular chamber 22, and as the stuffing nut 25 forces the gland 26 into the chamber 22, the packing 28 is compressed, forming a steam tight joint between the pipe 23 and nipple 20.

Brace supports 29 and 30 connect the headers 16 with the pipe support 11 and this construction ties the entire end of the exhaust together, and makes a brace sufficient to withstand the pressure exerted by the expansion of the pipes 13 through the stuffing boxes, and thereby preventing movement of the individual headers 16.

As will be noted by reference to Fig. 2, the header 16 located nearest the front of the pipe rack drier has all unions 24 and stuffing nuts 25 readily accessible for assembly, adjustment and dismounting, and that the next header 16 is located behind and at one side of the first named header, in such a position relative thereto as to render the unions 24 and stuffing nuts 25 of the second header readily accessible. Each succeeding header is in like manner located behind and at one side of the preceding header.

It will be readily understood that with my improved construction, I may readily assemble and dismount the elements referred to above, and adjust the same; that the exhaust header is rigidly positioned on the plate 10, and that each pipe 13 is movable relatively to the header to which it is attached to allow for unequal linear expansion of the individual pipes. Further, while I have shown the pipe rack drier as being constructed of four vertical rows of pipes 13, such showing is for convenience of illustration only, and I may vary the number of vertical rows employed to meet commercial requirements.

My invention is further described and defined in the form of claims as follows:

1. In a steam pipe rack drier, the combination of a plurality of series of pipes arranged in vertical planes and defining a plurality of horizontal shelves, a plurality of headers, one for each series of pipes, expansion means connecting each pipe of each series of pipes to the appropriate header, each succeeding header being arranged behind and at one side of each preceding header, whereby the expansion means are accessible for adjustment.

2. In a steam pipe rack drier, the combination of a plurality of pipes, a base plate, an exhaust header pipe rigidly mounted on said plate, and an expansion device connecting each pipe to the exhaust header.

In testimony whereof, I have signed my name to this specification.

GRAFTON E. LUCE.